United States Patent
Van Egmond et al.

(10) Patent No.: US 7,067,597 B2
(45) Date of Patent: Jun. 27, 2006

(54) PROCESS OF MAKING POLYPROPYLENE FROM INTERMEDIATE GRADE PROPYLENE

(75) Inventors: Cor F. Van Egmond, Pasadena, TX (US); Lawrence C. Smith, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 76 days.

(21) Appl. No.: 10/786,988

(22) Filed: Feb. 25, 2004

(65) Prior Publication Data

US 2005/0187358 A1  Aug. 25, 2005

(51) Int. Cl.
*C08F 110/06* (2006.01)

(52) U.S. Cl. ............. 526/68; 526/75; 526/77; 585/327; 585/329; 585/518

(58) Field of Classification Search ........... 585/327, 585/329, 518; 526/68, 75, 77
See application file for complete search history.

(56) References Cited

U.S. PATENT DOCUMENTS

| | | | |
|---|---|---|---|
| 3,407,789 A | 10/1968 | Hallee et al. ............. 122/356 |
| 3,647,682 A | 3/1972 | Rabo et al. ................ 208/120 |
| 3,758,403 A | 9/1973 | Rosinski et al. ........... 208/120 |
| 3,820,955 A | 6/1974 | Woebcke .................... 23/227 |
| 4,499,055 A | 2/1985 | DiNicolantonio et al. .. 422/197 |
| 4,499,263 A | 2/1985 | Messura et al. ............ 528/483 |
| 4,705,541 A | 11/1987 | Sircar ............................ 55/26 |
| 4,814,067 A | 3/1989 | Gartside et al. ............. 208/127 |
| 4,828,679 A | 5/1989 | Cormier, Jr. et al. ....... 208/120 |
| 4,980,053 A | 12/1990 | Li et al. ...................... 208/120 |
| 5,326,465 A | 7/1994 | Yongqing et al. ........... 208/120 |
| 5,714,662 A | 2/1998 | Vora et al. .................. 585/640 |
| 5,981,818 A * | 11/1999 | Purvis et al. ............... 585/519 |
| 6,271,319 B1 | 8/2001 | Baker et al. .................. 526/68 |
| 6,303,839 B1 * | 10/2001 | Marker ....................... 585/313 |
| 6,406,521 B1 | 6/2002 | Cheng et al. .................. 95/98 |
| 6,517,611 B1 | 2/2003 | Kuznicki et al. ............. 95/144 |
| 6,593,506 B1 | 7/2003 | Searle ........................ 585/639 |
| 6,660,812 B1 * | 12/2003 | Kuechler et al. ............. 526/68 |
| 2003/0181322 A1 | 9/2003 | Chang et al. ............... 502/214 |

FOREIGN PATENT DOCUMENTS

| | | |
|---|---|---|
| EP | 0 646 603 | 4/1995 |
| WO | WO 02/06188 | 1/2002 |
| WO | WO 02/26628 | 4/2002 |

* cited by examiner

Primary Examiner—Fred M. Teskin

(57) ABSTRACT

This invention concerns using an intermediate grade propylene stream as feed to a polypropylene forming reaction system. The intermediate grade propylene stream is preferably recovered form the olefin product of an oxygenate to olefins reaction process, and low in dimethyl ether content.

19 Claims, 2 Drawing Sheets

PROCESS OF MAKING POLYPROPYLENE FROM INTERMEDIATE GRADE PROPYLENE

FIELD OF THE INVENTION

This invention concerns polypropylene manufacturing processes. In particular, this invention concerns processes of making polypropylene from intermediate grade propylene.

BACKGROUND OF THE INVENTION

Polypropylene reaction processes involve adding propylene, a polypropylene forming catalyst, and other optional compounds, to a polymer reactor and producing polypropylene product. The product emerging from the reactor contains various contaminants, including unreacted propylene, that must be removed in order to obtain an acceptable polymer.

Propylene feedstreams for the production of polypropylene, as well as for the production of numerous other products, have traditionally been obtained through cracking of hydrocarbons. Non-catalytic cracking processes are described, for example, in Hallee et al., U.S. Pat. No. 3,407,789; Woebcke, U.S. Pat. No. 3,820,955, DiNicolantonio, U.S. Pat. No. 4,499,055 and Gartside et al., U.S. Pat. No. 4,814,067. Catalytic cracking processes are described, for example, in Cormier, Jr. et al., U.S. Pat. No. 4,828,679; Rabo et al., U.S. Pat. No. 3,647,682; Rosinski et al., U.S. Pat. No. 3,758,403; Gartside et al., U.S. Pat. No. 4,814,067; Li et al., U.S. Pat. No. 4,980,053; and Yongqing et al., U.S. Pat. No. 5,326,465.

A particular process of producing propylene streams is described in U.S. Pat. No. 5,714,662 to Vora et al. In this patent, an olefin product is first made by the catalytic conversion of a methanol feedstream. Then, a crude grade propylene stream is recovered from the olefin product as an overhead stream of a distillation column, with part of the crude propylene stream being used as feed to an etherification unit to form diisopropyl ether. A separate portion of the crude propylene stream is passed to a propylene fractionation zone to produce a high purity propylene stream.

As discussed in U.S. Pat. No. 6,271,319 to Baker et al., high purity propylene is generally used as feed to a polypropylene reaction process. This patent further notes that the presence of propane is typically a problem in polypropylene reaction systems, and the removal of propane is particularly difficult. Thus, a method of removing propane from the reaction system using a membrane is described.

The difficulty in removing propane from propylene streams means that extensive separation equipment is required to obtain a polymer grade propylene feedstream. In turn, such equipment is expensive and substantially increases the cost of the polymer grade propylene feedstream. It would, therefore, be beneficial to obtain lesser grade propylene feedstreams that would be effective in the manufacture of polypropylene. It would also be beneficial to recover unreacted contaminants such as propylene from polymer product.

SUMMARY OF THE INVENTION

This invention provides an intermediate grade propylene stream that can be effectively used as a polypropylene feedstream. Although the intermediate grade stream includes a higher quantity of propane that conventional polymer grade propylene streams, it nevertheless provides a high quality polypropylene product.

According to one aspect of the invention, there is provided a process for making polypropylene. The process comprises contacting an oxygenate stream with an olefin forming catalyst to form an olefin stream. An intermediate grade propylene stream is separated from the olefin stream, with the intermediate grade propylene stream preferably containing less than 99.5 wt % propylene, based on total weight of the stream. In one embodiment, the intermediate grade propylene stream is contacted with a polypropylene forming catalyst to form polypropylene and unreacted by-product. Propane is removed from the unreacted by-product to form at least one purge stream and a propylene containing recycle stream.

In another embodiment of the invention the process for making polypropylene includes a step of separating a propylene stream and a dimethyl ether stream from an olefin stream, with the propylene stream being separated as an overhead distillation stream and the dimethyl ether stream being separated as a bottoms distillation stream. Preferably, an intermediate grade propylene stream is recovered from the overhead stream, and is contacted with polypropylene forming catalyst to form polypropylene and unreacted by-product. In one embodiment, propylene is recovered from the unreacted by-product to form a recycle stream, and the recycle stream is contacted with polypropylene forming catalyst to form additional polypropylene product.

In yet another embodiment of making polypropylene, there is included a step of contacting an oxygenate stream with an olefin forming catalyst to form an olefin stream, wherein the olefin stream comprises propylene, propane and dimethyl ether. The propylene, propane and dimethyl ether are separated from the olefin stream so as to obtain an intermediate grade propylene stream, and the intermediate grade propylene stream is contacted with a polypropylene catalyst to form a polypropylene product.

There is further provided in this invention a process for making polypropylene product, which includes contacting an oxygenate stream with an olefin forming catalyst to form an olefin stream, separating a propylene stream from the olefin stream and sending the propylene stream to a propylene separation system. An intermediate grade propylene stream is recovered from the propylene separation system, and the intermediate grade propylene stream is contacted with a polypropylene forming catalyst to form a polypropylene product and unreacted propylene. In a preferred embodiment, at least a portion of the unreacted propylene is removed in the propylene separation system so that the intermediate grade propylene stream further comprises the removed portion of unreacted propylene.

In a preferred embodiment, the intermediate grade propylene stream of the invention contains less than 99 wt % propylene, based on total weight of the stream. More preferably, the intermediate grade propylene stream contains less than 98 wt % propylene, and most preferably less than 97 wt % propylene, based on total weight of the stream. It is also preferred that the polypropylene forming catalyst is a Ziegler Natta or metallocene catalyst.

BRIEF DESCRIPTION OF THE DRAWINGS

The attached Figures represent various aspects of the invention. The Figures are intended to be viewed as merely examples of specific embodiments within the scope of the overall invention as claimed.

DETAILED DESCRIPTION OF THE INVENTION

Figure 1:
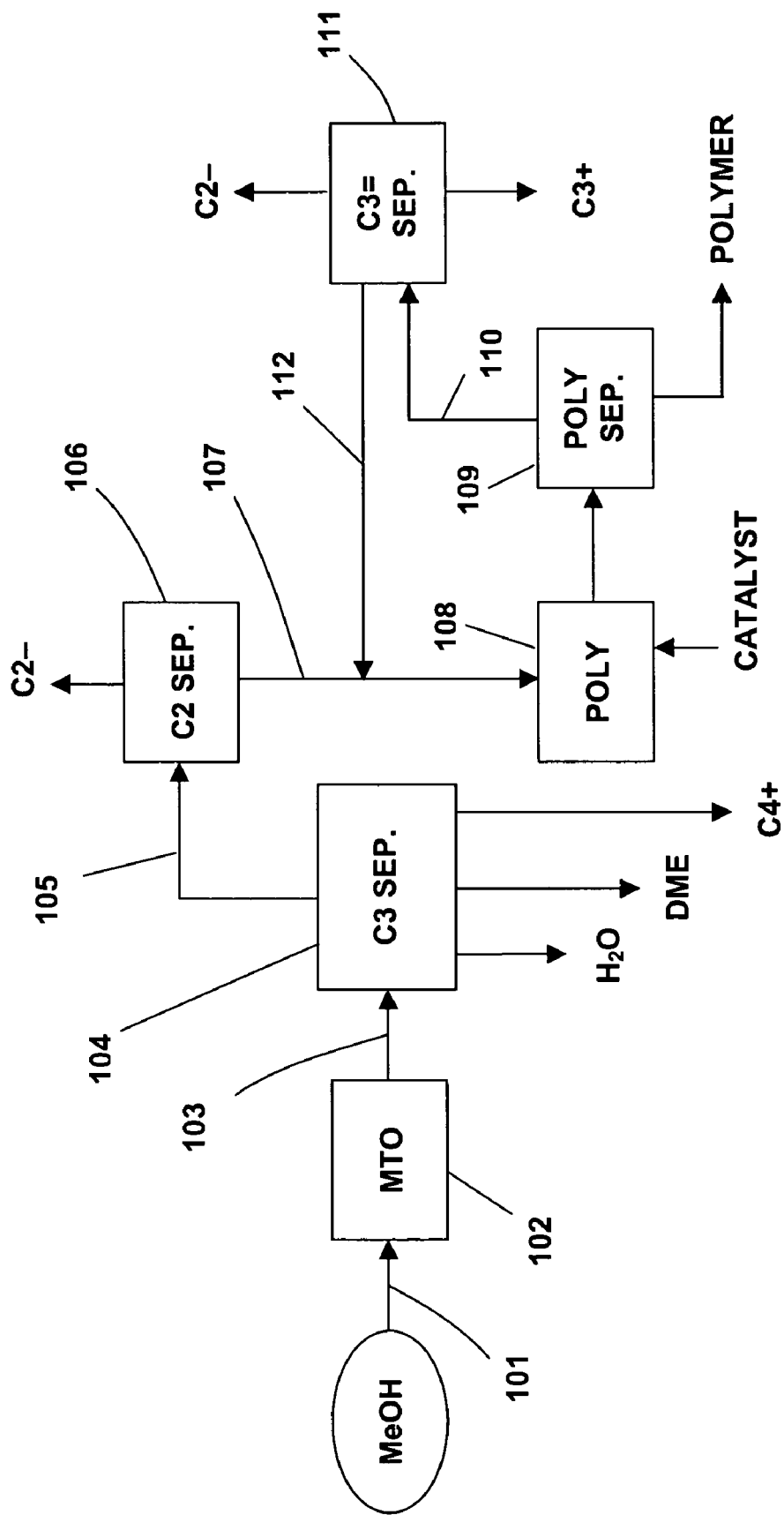
FIG. 1 is a flow diagram of separating an intermediate grade propylene stream from an olefin stream, and using the intermediate grade propylene stream as a feedstream to a polypropylene reaction system.

I. Intermediate Grade Propylene as Polypropylene Feed

This invention concerns using an intermediate grade propylene stream as feed to a polypropylene forming reaction system. The intermediate grade propylene stream is considered an intermediate grade with respect to commercially available chemical grade propylene (less than 95 wt % propylene) and polymer grade propylene (at least 99.5 wt % propylene). The composition of the intermediate grade stream is based on the composition of the stream supplied to the polypropylene reaction system without dilution from other sources. Dilution of the feed stream can occur, for example, in cases where recycle streams containing low concentrations of propylene are mixed with the intermediate grade stream, causing a significant reduction in propylene content of the mixed stream that is then sent to a polypropylene reaction system.

According to this invention, the intermediate grade propylene stream sent to the reaction system contains less than 99.5 wt % propylene, based on total weight of the propylene stream. Preferably, the intermediate grade propylene stream contains less than 99 wt %., more preferably less than 98 wt %, and most preferably less than 97 wt % propylene, based on total weight of the propylene stream. The intermediate grade propylene stream also contains at least 95 wt % propylene, based on total weight of the propylene stream.

Although the intermediate grade propylene stream will contain less than 5 wt % propane, based on total weight of the propylene stream, higher concentrations of propane than typically present in conventional polymer grade streams will be included. In one embodiment, the intermediate grade propylene stream contains at least 0.5 wt % propane, based on total weight of the propylene stream. In another, the intermediate grade propylene stream contains at least 1 wt % propane, based on total weight of the propylene stream. In yet another, the intermediate grade propylene stream contains at least 1.5 wt % propane, based on total weight of the propylene stream. In still another, the intermediate grade propylene stream contains at least 2 wt % propane, based on total weight of the propylene stream.

In one embodiment of the invention, the intermediate grade propylene stream is recovered from an olefin product stream of an oxygenate to olefins conversion process, as the propane content of that stream will typically be lower than from other sources such as hydrocarbon cracking processes. However, the olefin product stream from an oxygenate to olefins conversion process will typically be high in oxygenated hydrocarbon content, such as dimethyl ether, and these types of compounds will need to be removed, since they can effectively poison polypropylene catalysts.

The intermediate grade propylene stream that is used in this invention as feed to the polymerization system to make polypropylene will be sufficiently low in oxygenated hydrocarbon contaminants such as dimethyl ether so that the polypropylene conversion catalyst is not significantly adversely affected. In one embodiment, the intermediate grade propylene stream contains less than 100 wppm dimethyl ether, based on total weight of the intermediate grade propylene stream. Preferably, the intermediate grade propylene stream contains not greater than 10 wppm dimethyl ether, more preferably not greater than 1 wppm dimethyl ether, and most preferably not greater than 0.1 wppm dimethyl ether, based on total weight of the intermediate grade propylene stream.

In embodiments in which all or a portion of the intermediate grade propylene stream has been obtained from an oxygenate to olefins reaction product, a significant portion of oxygenated hydrocarbon contaminants will have been removed from the intermediate grade stream so the polypropylene catalyst will not be adversely affected. Removal of oxygenated hydrocarbon from a propylene-containing stream can be accomplished by any number of techniques, including for example, distillation or molecular sieve absorption or membrane filtration. In one embodiment of the invention, a dimethyl ether-containing stream and a propylene-containing stream are separated from an olefin product stream of an oxygenate to olefin reaction system, with the propylene-containing stream being separated as an overhead distillation stream, and the dimethyl ether-containing stream being separated as a bottoms distillation stream. The bottoms distillation stream will contain a majority of dimethyl ether and heavier boiling point compounds present in the olefin stream. Ethylene and lighter boiling point compounds, which may accompany the propylene-containing stream removed as the overhead stream, are preferably removed from the propylene-containing stream to form a preferred intermediate grade polypropylene stream.

Separating an intermediate grade propylene stream according to the processes of this invention is advantageous in that less rigorous methods of separation are needed to obtain a propylene stream that is suitable as a polypropylene feed stream. Although the feed stream does contain a somewhat higher concentration of propane than conventional polymer grade propylene feeds, the propane will not negatively impact the conversion of the propylene to polypropylene, since any propane will be essentially inert in the polyolefin reaction process.

Because this invention uses an intermediate propylene stream that contains some propane, it is preferable to remove or purge a portion of the propane by-product from the formed polyolefin product, if any unreacted propylene is to be recovered from the polyolefin product and recycled as feed. Purging propane by-product from recycled propylene will reduce the tendency for propane to build up in the polypropylene reaction system. Such a build up of propane would reduce efficiency in forming polypropylene, and could possibly result in unit shut down under extreme conditions.

II. Obtaining Intermediate Grade Propylene

A. Obtaining Intermediate Grade Propylene from Various Olefin Sources

The intermediate grade propylene stream that is used as feed for the polypropylene process of this invention can be obtained from any source. Such olefin streams include streams provided from any one or a combination of various olefin forming processes such as, for example, processes for cracking of petroleum streams or processes for the catalytic reaction of oxygenates to olefins.

B. Obtaining Intermediate Grade Propylene from Oxygenate to Olefins Processes

This invention is particularly beneficial in obtaining intermediate grade propylene from olefin streams made in whole or in part from oxygenate to olefins processes. In oxygenates to olefins processes, oxygenate hydrocarbon contaminants such as dimethyl ether are typically present in relatively high concentrations, and the presence of such oxygenates, even a relatively low levels, can cause problems in further processing various olefins (e.g., propylene) contained in these streams. For example, oxygenated hydrocarbon contaminants such as dimethyl ether can poison many polypropylene forming catalysts.

In one embodiment of the invention, an olefin stream, which contains propylene, is obtained from an olefin forming process, wherein the olefin stream contains at least about 100 wppm or at least about 250 wppm dimethyl ether, based on total hydrocarbon content of the stream (i.e., excluding any entrained water). Preferably, the amount of dimethyl ether contained in the olefin stream is not so high as to make separation of the dimethyl ether from the propylene impractical. In one embodiment, the olefin stream contains not greater than 5 wt % dimethyl ether, based on total hydrocarbon content of the stream. Preferably, the olefin stream contains not greater than 5 wt % dimethyl ether, more preferably not greater than 4 wt % dimethyl ether, and most preferably not greater than 3 wt % dimethyl ether, based on total hydrocarbon content of the stream.

In a particular embodiment of the invention, the intermediate grade propylene stream is separated from the obtained olefin stream by distillation. The separation of the intermediate grade propylene from the olefin stream can be accomplished using any variety of techniques, with the use of one or more distillation steps preferred. Such separation techniques are known to those of skill in the art. However, the intermediate grade propylene that is to be used as feed to a propylene polymerization process should not be too high in oxygenated hydrocarbon content or propane content so as to adversely impact the polymerization process.

It is preferred in this invention that the intermediate grade propylene stream be sufficiently dry so as not to adversely affect the polymerization process. In one embodiment, the intermediate grade propylene stream contains not greater than about 1,000 wppm water, based on total weight of the stream. Preferably, the intermediate grade propylene stream contains not greater than about 500 wppm water, more preferably not greater than 100 wppm water, and most preferably not greater than about 10 wppm water, based on total weight of the stream.

This invention is particularly beneficial in obtaining the intermediate grade propylene stream from olefin streams made in oxygenate to olefins processes. In oxygenate to olefins processes an oxygenate is contacted with an olefin forming catalyst to form an olefin product stream. Then the intermediate grade propylene is recovered from the olefin product stream as described above.

In the process of converting oxygenate to an olefin product, the oxygenate feedstock used in the process contains one or more oxygenates, more specifically, one or more organic compound(s) containing at least one oxygen atom. In the most preferred embodiment of the process of invention, the oxygenate in the feedstock is one or more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts. Non-limiting examples of oxygenates include methanol, ethanol, n-propanol, isopropanol, methyl ethyl ether, dimethyl ether, diethyl ether, di-isopropyl ether, formaldehyde, dimethyl carbonate, dimethyl ketone, acetic acid, and mixtures thereof. In the most preferred embodiment, the feedstock is selected from one or more of methanol, ethanol, dimethyl ether, diethyl ether or a combination thereof, more preferably methanol and dimethyl ether, and most preferably methanol.

The feedstock, in one embodiment, contains one or more diluent(s), typically used to reduce the concentration of the feedstock, and are generally non-reactive to the feedstock or olefin forming catalyst composition. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred.

The diluent is either added directly to a feedstock entering into a reactor or added directly into a reactor, or added with an olefin forming catalyst composition. In one embodiment, the amount of diluent in the feedstock is in the range of from about 1 to about 99 mole percent based on the total number of moles of the feedstock and diluent, preferably from about 1 to 80 mole percent, more preferably from about 5 to about 50, most preferably from about 5 to about 25. In one embodiment, other hydrocarbons are added to a feedstock either directly or indirectly, and include olefin(s), paraffin(s), aromatic(s) (see for example U.S. Pat. No. 4,677,242, addition of aromatics) or mixtures thereof, preferably propylene, butylene, pentylene, and other hydrocarbons having 4 or more carbon atoms, or mixtures thereof.

In one embodiment, the olefin forming catalyst is a molecular sieve capable of converting an oxygenate to an olefin compound. Such molecular sieves include zeolite as well as non-zeolite molecular sieves, and are of the large, medium or small pore type. Non-limiting examples of these molecular sieves capable of converting an oxygenate to an olefin compound are the small pore molecular sieves, AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof; the medium pore molecular sieves, AFO, AEL, EUO, HEU, FER, MEL, MFI, MTW, MTT, TON, and substituted forms thereof; and the large pore molecular sieves, EMT, FAU, and substituted forms thereof. Other molecular sieves capable of converting an oxygenate to an olefin compound include ANA, BEA, CFI, CLO, DON, GIS, LTL, MER, MOR, MWW and SOD. Non-limiting examples of the preferred molecular sieves capable of converting an oxygenate to an olefin compound, include AEL, AFY, BEA, CHA, EDI, FAU, FER, GIS, LTA, LTL, MER, MFI, MOR, MTT, MWW, TAM and TON. In one preferred embodiment, the molecular sieve capable of converting an oxygenate to an olefin compound has an AEI topology or a CHA topology, or a combination thereof, most preferably a CHA topology.

The small, medium and large pore molecular sieves capable of converting an oxygenate to an olefin compound have from a 4-ring to a 12-ring or greater framework-type. In a preferred embodiment, the molecular sieves capable of converting an oxygenate to an olefin compound have 8-, 10- or 12-ring structures or larger and an average pore size in the range of from about 3 Å to 15 Å. In the most preferred embodiment, the molecular sieves capable of converting an oxygenate to an olefin compound, preferably silicoaluminophosphate molecular sieves, have 8-rings and an average pore size less than about 5 Å, preferably in the range of from 3 Å to about 5 Å, more preferably from 3 Å to about 4.5 Å, and most preferably from 3.5 Å to about 4.2 Å.

Molecular sieves capable of converting an oxygenate to an olefin compound preferably have a molecular framework of one, preferably two or more corner-sharing [TO$_4$] tetrahedral units, more preferably, two or more [SiO$_4$], [AlO$_4$] and/or [PO$_4$] tetrahedral units, and most preferably [SiO$_4$], [AlO$_4$] and [PO$_4$] tetrahedral units. These silicon, aluminum, and phosphorous based molecular sieves and metal containing silicon, aluminum and phosphorous based molecular sieves have been described in detail in numerous publications including for example, U.S. Pat. No. 4,567,029 (MeAPO where Me is Mg, Mn, Zn, or Co), U.S. Pat. No. 4,440,871 (SAPO), European Patent Application EP-A-0 159 624 (ELAPSO where El is As, Be, B, Cr, Co, Ga, Ge, Fe, Li, Mg, Mn, Ti or Zn), U.S. Pat. No. 4,554,143 (FeAPO), U.S. Pat. Nos. 4,822,478, 4,683,217, 4,744,885 (FeAPSO), EP-A-0 158 975 and U.S. Pat. No. 4,935,216 (ZnAPSO, EP-A-0 161 489 (CoAPSO), EP-A-0 158 976 (ELAPO, where EL is Co, Fe, Mg, Mn, Ti or Zn), U.S. Pat. No. 4,310,440 (AlPO$_4$), EP-A-0 158 350 (SENAPSO), U.S. Pat. No. 4,973,460 (LiAPSO), U.S. Pat. No. 4,789,535 (LiAPO), U.S. Pat. No. 4,992,250 (GeAPSO), U.S. Pat. No. 4,888,167 (GeAPO), U.S. Pat. No. 5,057,295 (BAPSO), U.S. Pat. No. 4,738,837 (CrAPSO), U.S. Pat. Nos. 4,759,919, and 4,851,106 (CrAPO), U.S. Pat. Nos. 4,758,419, 4,882,038, 5,434,326 and 5,478,787 (MgAPSO), U.S. Pat. No. 4,554,143 (FeAPO), U.S. Pat. No. 4,894,213 (AsAPSO), U.S. Pat. No. 4,913,888 (AsAPO), U.S. Pat. Nos. 4,686,092, 4,846,956 and 4,793,833 (MnAPSO), U.S. Pat. Nos. 5,345,011 and 6,156,931 (MnAPO), U.S. Pat. No. 4,737,353 (BeAPSO), U.S. Pat. No. 4,940,570 (BeAPO), U.S. Pat. Nos. 4,801,309, 4,684,617 and 4,880,520 (TiAPSO), U.S. Pat. Nos. 4,500,651, 4,551,236 and 4,605,492 (TiAPO), U.S. Pat. Nos. 4,824,554, 4,744,970 (CoAPSO), U.S. Pat. No. 4,735,806 (GaAPSO) EP-A-0 293 937 (QAPSO, where Q is framework oxide unit [QO$_2$]), as well as U.S. Pat. Nos. 4,567,029, 4,686,093, 4,781,814, 4,793,984, 4,801,364, 4,853,197, 4,917,876, 4,952,384, 4,956,164, 4,956,165, 4,973,785, 5,241,093, 5,493,066 and 5,675,050, all of which are herein fully incorporated by reference.

Other molecular sieves capable of converting an oxygenate to an olefin compound include those described in EP-0 888 187 B1 (microporous crystalline metallophosphates, SAPO$_4$ (UIO-6)), U.S. Pat. No. 6,004,898 (molecular sieve and an alkaline earth metal), U.S. patent application Ser. No. 09/511,943 filed Feb. 24, 2000 (integrated hydrocarbon co-catalyst), PCT WO 01/64340 published Sep. 7, 2001 (thorium containing molecular sieve), and R. Szostak, *Handbook of Molecular Sieves*, Van Nostrand Reinhold, New York, N.Y. (1992), which are all herein fully incorporated by reference.

The more preferred silicon, aluminum and/or phosphorous containing molecular sieves capable of converting an oxygenate to an olefin compound include aluminophosphate (ALPO) molecular sieves and silicoaluminophosphate (SAPO) molecular sieves and substituted, preferably metal substituted, ALPO and SAPO molecular sieves. The most preferred molecular sieves capable of converting an oxygenate to an olefin compound are SAPO molecular sieves, and metal substituted SAPO molecular sieves. In an embodiment, the metal is an alkali metal of Group IA of the Periodic Table of Elements, an alkaline earth metal of Group IIA of the Periodic Table of Elements, a rare earth metal of Group IIIB, including the Lanthanides: lanthanum, cerium, praseodymium, neodymium, samarium, europium, gadolinium, terbium, dysprosium, holmium, erbium, thulium, ytterbium and lutetium; and scandium or yttrium of the Periodic Table of Elements, a transition metal of Groups IVB, VB, VIIB, VIIB, VIIIB, and IB of the Periodic Table of Elements, or mixtures of any of these metal species. In one preferred embodiment, the metal is selected from the group consisting of Co, Cr, Cu, Fe, Ga, Ge, Mg, Mn, Ni, Sn, Ti, Zn and Zr, and mixtures thereof. In another preferred embodiment, these metal atoms discussed above are inserted into the framework of a molecular sieve through a tetrahedral unit, such as [MeO$_2$], and carry a net charge depending on the valence state of the metal substituent. For example, in one embodiment, when the metal substituent has a valence state of +2, +3, +4, +5, or +6, the net charge of the tetrahedral unit is between −2 and +2.

In one embodiment, the molecular sieve capable of converting an oxygenate to an olefin compound, as described in many of the U.S. Patents mentioned above, is represented by the empirical formula, on an anhydrous basis: mR:(M$_x$Al$_y$P$_z$)O$_2$ wherein R represents at least one templating agent, preferably an organic templating agent; m is the number of moles of R per mole of (M$_x$Al$_y$P$_z$)O$_2$ and m has a value from 0 to 1, preferably 0 to 0.5, and most preferably from 0 to 0.3; x, y, and z represent the mole fraction of Al, P and M as tetrahedral oxides, where M is a metal selected from one of Group IA, IIA, IB, IIB, IVB, VB, VIIB, VIIB, VIIIB and Lanthanide's of the Periodic Table of Elements, preferably M is selected from one of the group consisting of Co, Cr, Cu, Fe, Ga, Ge, Mg, Mn, Ni, Sn, Ti, Zn and Zr. In an embodiment, m is greater than or equal to 0.2, and x, y and z are greater than or equal to 0.01.

In another embodiment, m is greater than 0.1 to about 1, x is greater than 0 to about 0.25, y is in the range of from 0.4 to 0.5, and z is in the range of from 0.25 to 0.5, more preferably m is from 0.15 to 0.7, x is from 0.01 to 0.2, y is from 0.4 to 0.5, and z is from 0.3 to 0.5.

Non-limiting examples of SAPO and ALPO molecular sieves capable of converting an oxygenate to an olefin compound include one or a combination of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44 (U.S. Pat. No. 6,162,415), SAPO-47, SAPO-56, ALPO-5, ALPO-11, ALPO-18, ALPO-31, ALPO-34, ALPO-36, ALPO-37, ALPO-46, and metal containing molecular sieves thereof. The more preferred molecular sieves capable of converting an oxygenate to an olefin compound include one or a combination of SAPO-18, SAPO-34, SAPO-35, SAPO-44, SAPO-56, ALPO-18 and ALPO-34, even more preferably one or a combination of SAPO-18, SAPO-34, ALPO-34 and ALPO-18, and metal containing molecular sieves thereof, and most preferably one or a combination of SAPO-34 and ALPO-18, and metal containing molecular sieves thereof.

In an embodiment, the molecular sieve capable of convening an oxygenate to an olefin compound is an intergrowth material having two or more distinct phases of crystalline structures within one molecular sieve composition. In particular, intergrowth molecular sieves are described in the U.S. Pat. No. 6,812,372 and PCT WO 98/15496 published Apr. 16, 1998, the intergrowth descriptions being incorporated herein by reference. In another embodiment, the molecular sieve capable of converting an oxygenate to an olefin compound comprises at least one intergrown phase of AEI and CHA framework-types. For example, SAPO-18, ALPO-18 and RUW-18 have an ALEI framework-type, and SAPO-34 has a CHA framework-type.

In one embodiment, the molecular sieves capable of converting an oxygenate to an olefin compound are combined with one or more other molecular sieves. In another embodiment, the preferred silicoaluminophosphate or aluminophosphate molecular sieves, or a combination thereof, are combined with one more of the following non-limiting examples of molecular sieves described in the following: Beta (U.S. Pat. No. 3,308,069), ZSM-5 (U.S. Pat. Nos. 3,702,886, 4,797,267 and 5,783,321), ZSM-11 (U.S. Pat. No. 3,709,979), ZSM-12 (U.S. Pat. No. 3,832,449), ZSM-12 and ZSM-38 (U.S. Pat. No. 3,948,758), ZSM-22 (U.S. Pat. No. 5,336,478), ZSM-23 (U.S. Pat. No. 4,076,842), ZSM-34 (U.S. Pat. No. 4,086,186), ZSM-35 (U.S. Pat. No. 4,016,245, ZSM-48 (U.S. Pat. No. 4,397,827), ZSM-58 (U.S. Pat. No. 4,698,217), MCM-1 (U.S. Pat. No. 4,639,358), MCM-2 (U.S. Pat. No. 4,673,559), MCM-3 (U.S. Pat. No. 4,632,811), MCM-4 (U.S. Pat. No. 4,664,897), MCM-5 (U.S. Pat. No. 4,639,357), MCM-9 (U.S. Pat. No. 4,880,611), MCM-10 (U.S. Pat. No. 4,623,527), MCM-14 (U.S. Pat. No. 4,619,818), MCM-22 (U.S. Pat. No. 4,954,325), MCM-41 (U.S. Pat. No. 5,098,684), M-41S (U.S. Pat. No. 5,102,643), MCM-48 (U.S. Pat. No. 5,198,203), MCM-49 (U.S. Pat. No. 5,236,575), MCM-56 (U.S. Pat. No. 5,362,697), ALPO-11 (U.S. Pat. No. 4,310,440), titanium aluminosilicates (TASO), TASO-45 (EP-A-0 229,-295), boron silicates (U.S. Pat. No. 4,254,297), titanium aluminophosphates (TAPO) (U.S. Pat. No. 4,500,651), mixtures of ZSM-5 and ZSM-11 (U.S. Pat. No. 4,229,424), ECR-18 (U.S. Pat. No. 5,278,345), SAPO-34 bound ALPO-5 (U.S. Pat. No. 5,972,203), PCT WO 98/57743 published Dec. 23, 1988 (molecular sieve and Fischer-Tropsch), U.S. Pat. No. 6,300,535 (MFI-bound zeolites), and mesoporous molecular sieves (U.S. Pat. Nos. 6,284,696, 5,098,684, 5,102,643 and 5,108,725), which are all herein fully incorporated by reference.

The molecular sieves capable of converting an oxygenate to an olefin compound are made or formulated into catalysts by combining the synthesized molecular sieves with a binder and/or a matrix material to form a molecular sieve catalyst composition or a formulated molecular sieve catalyst composition. This formulated molecular sieve catalyst composition is formed into useful shape and sized particles by conventional techniques such as spray drying, pelletizing, extrusion, and the like.

There are many different binders that are useful in forming the molecular sieve catalyst composition. Non-limiting examples of binders that are useful alone or in combination include various types of hydrated alumina, silicas, and/or other inorganic oxide sol. One preferred alumina containing sol is aluminum chlorhydrol. The inorganic oxide sol acts like glue binding the synthesized molecular sieves and other materials such as the matrix together, particularly after thermal treatment. Upon heating, the inorganic oxide sol, preferably having a low viscosity, is converted into an inorganic oxide matrix component. For example, an alumina sol will convert to an aluminum oxide matrix following heat treatment.

Aluminum chlorhydrol, a hydroxylated aluminum based sol containing a chloride counter ion, has the general formula of $Al_mO_n(OH)_oCl_p \cdot x(H_2O)$ wherein m is 1 to 20, n is 1 to 8, o is 5 to 40, p is 2 to 15, and x is 0 to 30. In one embodiment, the binder is $Al_{13}O_4(OH)_{24}Cl_7 \cdot 12(H_2O)$ as is described in G. M. Wolterman, et al., Stud. Surf. Sci. and Catal., 76, pages 105–144 (1993), which is herein incorporated by reference. In another embodiment, one or more binders are combined with one or more other non-limiting examples of alumina materials such as aluminum oxyhydroxide, γ-alumina, boehmite, diaspore, and transitional aluminas such as α-alumina, β-alumina, γ-alumina, δ-alumina, ε-alumina, κ-alumina, and ρ-alumina, aluminum trihydroxide, such as gibbsite, bayerite, nordstrandite, doyelite, and mixtures thereof.

In another embodiment, the binders are alumina sols, predominantly comprising aluminum oxide, optionally including some silicon. In yet another embodiment, the binders are peptized alumina made by treating alumina hydrates such as pseudobohemite, with an acid, preferably an acid that does not contain a halogen, to prepare sols or aluminum ion solutions. Non-limiting examples of commercially available colloidal alumina sols include Nalco 8676 available from Nalco Chemical Co., Naperville, Ill., and Nyacol available from The PQ Corporation, Valley Forge, Pa.

The molecular sieve capable of converting an oxygenate to an olefin compound, in a preferred embodiment, is combined with one or more matrix material(s). Matrix materials are typically effective in reducing overall catalyst cost, act as thermal sinks assisting in shielding heat from the catalyst composition for example during regeneration, densifying the catalyst composition, increasing catalyst strength such as crush strength and attrition resistance, and to control the rate of conversion in a particular process.

Non-limiting examples of matrix materials include one or more of: rare earth metals, metal oxides including titania, zirconia, magnesia, thoria, beryllia, quartz, silica or sols, and mixtures thereof, for example silica-magnesia, silica-zirconia, silica-titania, silica-alumina and silica-alumina-thoria. In an embodiment, matrix materials are natural clays such as those from the families of montmorillonite and kaolin. These natural clays include sabbentonites and those kaolins known as, for example, Dixie, McNamee, Georgia and Florida clays. Non-limiting examples of other matrix materials include: haloysite, kaolinite, dickite, nacrite, or anauxite. In one embodiment, the matrix material, preferably any of the clays, are subjected to well known modification processes such as calcination and/or acid treatment and/or chemical treatment.

In one preferred embodiment, the matrix material is a clay or a clay-type composition, preferably the clay or clay-type composition having a low iron or titania content, and most preferably the matrix material is kaolin. Kaolin has been found to form a pumpable, high solid content slurry, it has a low fresh surface area, and it packs together easily due to its platelet structure. A preferred average particle size of the matrix material, most preferably kaolin, is from about 0.1 μm to about 0.6 μm with a D90 particle size distribution of less than about 1 μm.

In another embodiment, the weight ratio of the binder to the matrix material used in the formation of the molecular sieve catalyst composition is from 0:1 to 1:15, preferably 1:15 to 1:5, more preferably 1:10 to 1:4, and most preferably 1:6 to 1:5. It has been found that a higher sieve content, lower matrix content, increases the molecular sieve catalyst composition performance, however, lower sieve content, higher matrix material, improves the attrition resistance of the composition.

In another embodiment, the formulated molecular sieve catalyst composition capable of converting an oxygenate to an olefin compound contains from about 1% to about 99%, more preferably from about 5% to about 90%, and most preferably from about 10% to about 80%, by weight of the molecular sieve based on the total weight of the molecular sieve catalyst composition.

In another embodiment, the weight percent of binder in or on the spray dried molecular sieve catalyst composition capable of converting an oxygenate to an olefin compound, based on the total weight of the binder, molecular sieve, and matrix material, is from about 2% by weight to about 30% by weight, preferably from about 5% by weight to about 20% by weight, and more preferably from about 7% by weight to about 15% by weight.

Once the molecular sieve catalyst composition capable of converting an oxygenate to an olefin compound is formed in a substantially dry or dried state, to further harden and/or activate the formed catalyst composition, a heat treatment such as calcination, at an elevated temperature is usually performed. A conventional calcination environment is air that typically includes a small amount of water vapor. Typical calcination temperatures are in the range from about 400° C. to about 1,000° C., preferably from about 500° C. to about 800° C., and most preferably from about 550° C. to about 700° C., preferably in a calcination environment such as air, nitrogen, helium, flue gas (combustion product lean in oxygen), or any combination thereof.

The process for converting a feedstock, especially a feedstock containing one or more oxygenates, in the presence of a molecular sieve catalyst composition capable of converting an oxygenate to an olefin compound, is carried out in a reaction process in a reactor, where the process is a fixed bed process, a fluidized bed process (includes a turbulent bed process), preferably a continuous fluidized bed process, and most preferably a continuous high velocity fluidized bed process.

The reaction processes can take place in a variety of catalytic reactors such as hybrid reactors that have a dense bed or fixed bed reaction zones and/or fast fluidized bed reaction zones coupled together, circulating fluidized bed reactors, riser reactors, and the like. Suitable conventional reactor types are described in for example U.S. Pat. No. 4,076,796, U.S. Pat. No. 6,287,522 (dual riser), and *Fluidization Engineering*, D. Kunii and O. Levenspiel, Robert E. Krieger Publishing Company, New York, N.Y. 1977, which are all herein fully incorporated by reference.

The preferred oxygenate conversion reactor types are riser reactors, such as those generally described in Riser Reactor, *Fluidization and Fluid-Particle Systems*, pages 48 to 59, F. A. Zenz and D. F. Othmo, Reinhold Publishing Corporation, New York, 1960, and U.S. Pat. No. 6,166,282 (fast-fluidized bed reactor), and U.S. patent application Ser. No. 09/564,613 filed May 4, 2000 (multiple riser reactor), which references are all herein fully incorporated by reference.

In the preferred embodiment, a fluidized bed process or high velocity fluidized bed process includes a reactor system, a regeneration system and a recovery system. The reactor system preferably is a fluid bed reactor system having a first reaction zone within one or more riser reactor(s) and a second reaction zone within at least one disengaging vessel, preferably comprising one or more cyclones. In one embodiment, the one or more riser reactor(s) and disengaging vessel is contained within a single reactor vessel. Fresh feedstock, preferably containing one or more oxygenates, optionally with one or more diluent(s), is fed to the one or more riser reactor(s) in which a zeolite or zeolite-type molecular sieve catalyst composition or coked version thereof is introduced. In one embodiment, the molecular sieve catalyst composition or coked version thereof is contacted with a liquid or gas, or combination thereof, prior to being introduced to the riser reactor(s), preferably the liquid is water or methanol, and the gas is an inert gas such as nitrogen.

In an embodiment, the amount of fresh feedstock fed separately or jointly with a vapor feedstock, to a reactor system is in the range of from 0.1 weight percent to about 85 weight percent, preferably from about 1 weight percent to about 75 weight percent, more preferably from about 5 weight percent to about 65 weight percent based on the total weight of the feedstock including any diluent contained therein. The liquid and vapor feedstocks are preferably the same composition, or contain varying proportions of the same or different feedstock with the same or different diluent.

The feedstock entering the reactor system is preferably converted, partially or fully, in the first reactor zone into a gaseous effluent that enters the disengaging vessel along with a coked molecular sieve catalyst composition. In the preferred embodiment, cyclone(s) within the disengaging vessel are designed to separate the molecular sieve catalyst composition, preferably a coked molecular sieve catalyst composition, from the gaseous effluent containing one or more olefin(s) within the disengaging zone. Cyclones are preferred, however, gravity effects within the disengaging vessel will also separate the catalyst compositions from the gaseous effluent. Other methods for separating the catalyst compositions from the gaseous effluent include the use of plates, caps, elbows, and the like.

In one embodiment of the disengaging system, the disengaging system includes a disengaging vessel, typically a lower portion of the disengaging vessel is a stripping zone. In the stripping zone the coked molecular sieve catalyst composition is contacted with a gas, preferably one or a combination of steam, methane, carbon dioxide, carbon monoxide, hydrogen, or an inert gas such as argon, preferably steam, to recover adsorbed hydrocarbons from the coked molecular sieve catalyst composition that is then introduced to the regeneration system. In another embodiment, the stripping zone is in a separate vessel from the disengaging vessel and the gas is passed at a gas hourly superficial velocity (GHSV) of from 1 $hr^{-1}$ to about 20,000 $hr^{-1}$ based on the volume of gas to volume of coked molecular sieve catalyst composition, preferably at an elevated temperature from 250° C. to about 750° C., preferably from about 350° C. to 650° C., over the coked molecular sieve catalyst composition.

The conversion temperature employed in the conversion process, specifically within the reactor system, is in the range of from about 200° C. to about 1,000° C., preferably from about 250° C. to about 800° C., more preferably from about 250° C. to about 750° C., yet more preferably from about 300° C. to about 650° C., yet even more preferably from about 350° C. to about 600° C. most preferably from about 350° C. to about 550° C.

The conversion pressure employed in the conversion process, specifically within the reactor system, is not critical. The conversion pressure is based on the partial pressure of the feedstock exclusive of any diluent therein. Typically the conversion pressure employed in the process is in the range of from about 0.1 kPaa to about 5 MPaa, preferably from about 5 kPaa to about 1 MPaa, and most preferably from about 20 kPaa to about 500 kPaa.

The weight hourly space velocity (WHSV), particularly in a process for converting a feedstock containing one or more oxygenates in the presence of a molecular sieve catalyst composition within a reaction zone, is defined as the total weight of the feedstock excluding any diluents to the reaction zone per hour per weight of molecular sieve in the molecular sieve catalyst composition in the reaction zone.

The WHSV is maintained at a level sufficient to keep the catalyst composition in a fluidized state within a reactor.

Typically, the WHSV in the oxygenate conversion reactor ranges from about 1 hr$^{-1}$ to about 5000 hr$^{-1}$, preferably from about 2 hr$^{-1}$ to about 3000 hr$^{-1}$, more preferably from about 5 hr$^{-1}$ to about 1500 hr$^{-1}$, and most preferably from about 10 hr$^{-1}$ to about 1000 hr$^{-1}$. In one preferred embodiment, the WHSV is greater than 20 hr$^{-1}$, preferably the WHSV for conversion of a feedstock containing methanol and dimethyl ether is in the range of from about 20 hr$^{-1}$ to about 300 hr$^{-1}$.

The superficial gas velocity (SGV) of the feedstock including diluent and reaction products within the oxygenate conversion reactor system is preferably sufficient to fluidize the molecular sieve catalyst composition within a reaction zone in the reactor. The SGV in the process, particularly within the reactor system, more particularly within the riser reactor(s), is at least 0.1 meter per second (m/sec), preferably greater than 0.5 m/sec, more preferably greater than 1 m/sec, even more preferably greater than 2 m/sec, yet even more preferably greater than 3 m/sec, and most preferably greater than 4 m/sec. See for example U.S. patent application Ser. No. 09/708,753 filed Nov. 8, 2000, which is herein incorporated by reference.

In one preferred embodiment of the process for converting an oxygenate to olefin(s) using a silicoaluminophosphate molecular sieve catalyst composition, the process is operated at a WHSV of at least 20 hr$^{-1}$ and a Temperature Corrected Normalized Methane Selectivity (TCNMS) of less than 0.016, preferably less than or equal to 0.01. See for example U.S. Pat. No. 5,952,538, which is herein fully incorporated by reference.

In another embodiment of the processes for converting an oxygenate such as methanol to one or more olefin(s) using a molecular sieve catalyst composition, the WHSV is from 0.01 hr$^{-1}$ to about 100 hr$^{-1}$, at a temperature of from about 350° C. to 550° C., and silica to Me$_2$O$_3$ (Me is a Group IIIA or VIII element from the Periodic Table of Elements) molar ratio of from 300 to 2500. See for example EP-0 642 485 B1, which is herein fully incorporated by reference.

Other processes for converting an oxygenate such as methanol to one or more olefin(s) using a molecular sieve catalyst composition are described in PCT WO 01/23500 published Apr. 5, 2001 (propane reduction at an average catalyst feedstock exposure of at least 1.0), which is herein incorporated by reference.

According to one embodiment, the conversion of the primary oxygenate, e.g., methanol, is from about 90 wt % to about 98 wt %, based on the total amount of the primary oxygenate being converted. According to another embodiment the conversion of methanol is from about 92 wt % to about 98 wt %, preferably from about 94 wt % to about 98 wt %, based on the total amount of the primary oxygenate being converted.

According to another embodiment, the conversion of methanol is above 98 wt % to less than 100 wt %. According to another embodiment, the conversion of methanol is from 98.1 wt % to less than 100 wt %; preferably from 98.2 wt % to 99.8 wt %. According to another embodiment, the conversion of methanol is from 98.2 wt % to less than 99.5 wt %; preferably from 98.2 wt % to 99 wt %.

The oxygenate to olefin process forms a substantial amount of water as a by-product. Much of this water can be removed by cooling the olefin stream from the oxygenate reactor to a temperature below the condensation temperature of the water in the stream. Preferably, the temperature of the product stream is cooled to a temperature below the condensation temperature of the oxygenate feed for the oxygenate to olefins process. In certain embodiments, it is desirable to cool the product stream below the condensation temperature of methanol.

A quench column is one type of equipment that is effective in cooling the olefin stream from the olefin to oxygenate reaction process. In a quench column, a quenching fluid is directly contacted with the olefin stream to cool the stream to the desired condensation temperature. Condensation produces the condensed water containing stream, which is also referred to as a heavy bottoms stream. The olefin portion of the olefin product stream remains a vapor, and exits the quench column as an overhead vapor stream. The overhead vapor stream is rich in olefin product, and can also contain some oxygenated hydrocarbon by-products as well as water.

In one embodiment, the quenching fluid is a recycle stream of the condensed water containing, heavy bottoms stream of the quench column. This water containing stream is desirably cooled, e.g., by a heat exchanger, and injected back into the quench column. It is preferred in this embodiment to not inject cooling medium from an outside source into the quench column, although it may be desirable to do so in other separation equipment down stream of the quench column.

In one particular embodiment of the invention, the quenched olefin stream is further processed by compression, preferably multi-staged compression. Two, three, four or more stages can be used, with two or three stages being preferred.

In another embodiment of the invention, the olefin stream is compressed to a pressure that is greater than that at which the oxygenate to olefin reaction process is carried out. Preferably, the olefin stream is compressed to a pressure of at least about 30 psia (207 kPa), more preferably at least about 50 psia (345 kPa), most preferably at least about 100 psia (689 kPa). High pressure ranges are particularly preferred, with the upper limit being a practical one based on cost of design and ease of operation. Practical high pressure limits are generally considered to be up to about 5,000 psia (34,450 kPa), with lower limits of about 1,000 psia (6,895 kPa), about 750 psia (5171 kPa), and about 500 psia (3447 kPa) being increasingly preferred.

In one embodiment of the invention, the olefin product stream from the oxygenate to olefins reaction process is quenched, compressed, and separated into various olefin component streams, including the intermediate grade propylene grade stream. The intermediate grade stream is then contacted with polypropylene forming catalyst to form polypropylene.

III. Converting Propylene Feed to Polypropylene

A. Polypropylene Forming Catalyst

The intermediate grade propylene stream, and optionally other olefins, are contacted with a polypropylene forming catalyst to form polypropylene and by-products, including unreacted by-products such as unreacted propylene and propane. In one embodiment, the polypropylene forming catalyst comprises one or more Ziegler-Natia catalysts, conventional-type transition metal catalysts, metallocene catalysts, chromium catalysts, or vanadium catalysts, including one or more combinations thereof.

Non-limiting examples of Ziegier-Natta catalysts useful in this invention include those Ziegler-Natta catalysts described in *Ziegler-Natta Catalysts and Polymerizations*, John Boor, Academic Press, New York, 1979. Non-limiting examples of conventional-type transition metal catalysts include those discussed in U.S. Pat. Nos. 4,115,639, 4,077, 904, 4,482,687, 4,564,605, 4,721,763, 4,879,359 and 4,960,741 all of which are herein fully incorporated by reference.

Other examples of conventional-type transition metal catalysts useful in this invention include those based on magnesium/titanium electron-donor complexes. Such catalysts are described, for example, in U.S. Pat. Nos. 4,302,565 and 4,302,566, which are fully incorporated herein by reference. A particularly preferred transition metal catalyst is a $MgTiCl_6$(ethyl acetate)$_4$ derivative.

British Patent Application 2,105,355 and U.S. Pat. No. 5,317,036, incorporated herein by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2$(OBu) where Bu=butyl and $VO(OC_2H_5)_3$; vanadium tetra-halide and vanadium alkoxy halides such as $VCl_4$ and $VCl_3$(OBu); vanadium and vanadyl acetyl acetonates and chloroacetyl acetonates such as $V(AcAc)_3$ and $VOCl_2(AcAc)$ where (AcAc) is an acetyl acetonate. Preferred conventional-type vanadium catalyst compounds include $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in this invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 3,709,853, 3,709,954, 3,231,550, 3,242,099 and 4,077,904, each of which are fully incorporated herein by reference.

Still other conventional-type transition metal catalyst compounds and catalyst systems suitable for use in this invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585, as well as in European published applications, EP-A2 0 416 815 A2 and EP-A1 0 420 436, each of which are incorporated herein by reference.

Other suitable catalysts include cationic catalysts such as $AlCl_3$, as well as cobalt, iron, nickel and palladium catalysts well known in the art. See, for example U.S. Pat. Nos. 3,487,112, 4,472,559, 4,182,814 and 4,689,437, each of which are incorporated herein by reference.

Metallocene-type catalyst compounds and catalyst systems useful in the invention include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503; PCT publications WO 93/08221, WO 93/08199, WO 95/07140, WO 98/11144, WO 98/41530, WO 98/41529, WO 98/46650, WO 99/02540 and WO 99/14221; and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, each of which are fully incorporated herein by reference.

In one embodiment, metallocene-type catalyst compounds useful in the invention include bridged heteroatom, mono-bulky ligand metallocene-type compounds. These types of catalysts and catalyst systems are described, for example, in PCT publications WO 92/00333, WO 94/07928, WO 91/04257, WO 94/03506, WO 96/00244, WO 97/15602 and WO 99/20637; U.S. Pat. Nos. 5,057,475, 5,096,867, 5,055,438, 5,198,401, 5,227,440 and 5,264,405; and European patent publication EP-A-0 420 436, each of which are fully incorporated herein by reference.

B. Polypropylene Reactors and Reaction Processes

Any conventional reactor type may be used for the polymerization process of this invention. Non-limiting examples include fluid bed reactors, slurry reactors, or linear flow reactors. The use of a fluid bed reactor is described in U.S. Pat. No. 4,482,687, the reactor and catalyst description expressly being incorporated herein. The use of a linear flow loop type reactor is disclosed in U.S. Pat. No. 5,684,097, the reactor and catalyst description being expressly incorporated herein.

In a fluid bed process, solid polymer powder is maintained in a fluidized state by passing a stream of reaction gas up from the base of a reactor, where the reaction gas comprises olefin monomer. The reaction gas is withdrawn from the top of the reactor cooled and then recycled back to the base of the reactor. Solid polymer is removed as it builds up at the base of the reactor. A high rate of reaction gas recycle is typically required to achieve fluidization. Generally the recycle rate is about 50 times the rate of a stream of new olefin gas feed to the column. The new olefin gas stream is fed to the column at a rate equal to the withdraw of polyolefin product and any purge stream.

A loop reactor is a preferred form of a linear flow reactor. In a loop reactor, long straight lengths of tubing are interjected with short bends forming a loop. Monomer(s), catalyst, and, optionally, solvent are charged into the loop forming a slurry. Polymer formed in the loop is removed from the reactor along with unreacted monomer and diluent or solvent. Multiple loops may be used with portions of the slurry from the first reactor withdrawn and added to a second loop reactor.

C. Recovering and Recycling Propylene from Polypropylene Product

Polypropylene product that leaves the polypropylene reactor contains polypropylene as well as various contaminants. Such contaminants include unreacted propylene and propane, as well as incompletely formed polymers and solvents, if solvents are used in the process. The unreacted propylene is preferably recovered and used as a recycle feed to the polymerization process. Other contaminants are removed and discarded as appropriate.

In one embodiment, contaminants are removed from the polypropylene product by way of a purge stream using conventional polymer separation systems. Purging of contaminants, including unreacted propylene and propane, from polypropylene product can be accomplished using any conventional process. Non-limiting examples include flashing, cooling (i.e., condensation), distillation, absorption or combinations of these, depending on whether the effluent from the polymerization reactor is in the liquid phase or the gas phase, and on what other components are present. Physical phase separation of powder or particle streams from gas streams, or of liquid streams from gas streams, can be carried out, for example, using gravity separators or cyclone separators.

From the purge stream propylene is recovered and sent as recycle feed to the polymerization process. In general, propane and propylene will be recovered by way of the purge stream and, preferably, a substantial portion of the propane is separated from the unreacted propylene so that a substantial amount of propane is not recycled to the reaction process. Such separation of propane from the purge stream can be accomplished by conventional means, including distillation or separation using molecular sieves or membranes.

According to one embodiment of the invention, 90 wt % to 99.9 wt % of the propylene from the intermediate grade propylene feed stream that unreacted monomer is recovered from a propane purge system or tower and recycled to the polymerization process. Preferably, 92 wt % to 99.5 wt %, more preferably 95 wt % to 99.3 wt %, and most preferably 97 wt % to 99 wt % of the unreacted propylene from the polypropylene reactors is recovered and recycled to the polymerization process. Thus, the process of this invention allows for the recovery of unreacted propylene in the purge stream.

One example of a process of this invention is shown in FIG. 1. According to the embodiment of FIG. 1, methanol is sent through a line 101 to a methanol to olefins reaction unit 102. Olefin product leaves the reaction unit 102 by way of a line 103, and is sent to a C3 separation system 104. In the C3 separation system 104, which includes at least one distillation column, a propylene-containing stream that includes propane and lighter boiling point hydrocarbons is separated and removed through a line 105 as an overhead distillation stream, while heavier boiling point components such as water ($H_2O$), dimethyl ether (DME), and C4 and heavier boiling point hydrocarbons (C4+) are removed as bottom distillation streams.

The propylene-containing stream flowing through the line 105 is sent to a C2 separation system 106, which includes at least one distillation column. Intermediate grade propylene is separated in the C2 separation system 106 as a bottoms distillation stream, with ethane and lighter boiling point compounds (C2-) being removed as an overhead distillation stream.

The intermediate grade propylene steam is flowed through a line 107 and sent to a polypropylene reaction process 108, along with a polypropylene forming catalyst. The polypropylene product of the reaction process is sent to a polypropylene separation system 109 where polypropylene polymer is separated from contaminants.

The contaminants, which include unreacted propylene and propane, that are separated in the separation system 109 are sent through a line 110 to a propylene (C3=) separation system (i.e., propane purge tower) 111. Ethane and lighter boiling point compounds (C2-), as well as propane and heavier boiling point compounds (C3+), are separated from the unreacted propylene, and the unreacted propylene is sent through a line 112 for further contact with catalyst in the polypropylene reaction process 8. Typically, the propylene concentration in the propylene recycle stream flowing through line 112 ranges from about 30 wt % to 60%, with higher concentrations of propylene being preferred. In the embodiment of FIG. 1, the recycle stream is combined with the intermediate grade propylene stream and sent to the polypropylene reaction process 108. Thus, in this embodiment the intermediate grade polymer stream becomes diluted with the contents of the recycle stream and it is a dilute or mixed feed stream that actually enters the polypropylene reactor in the polypropylene reaction system 108.

Figure 2:
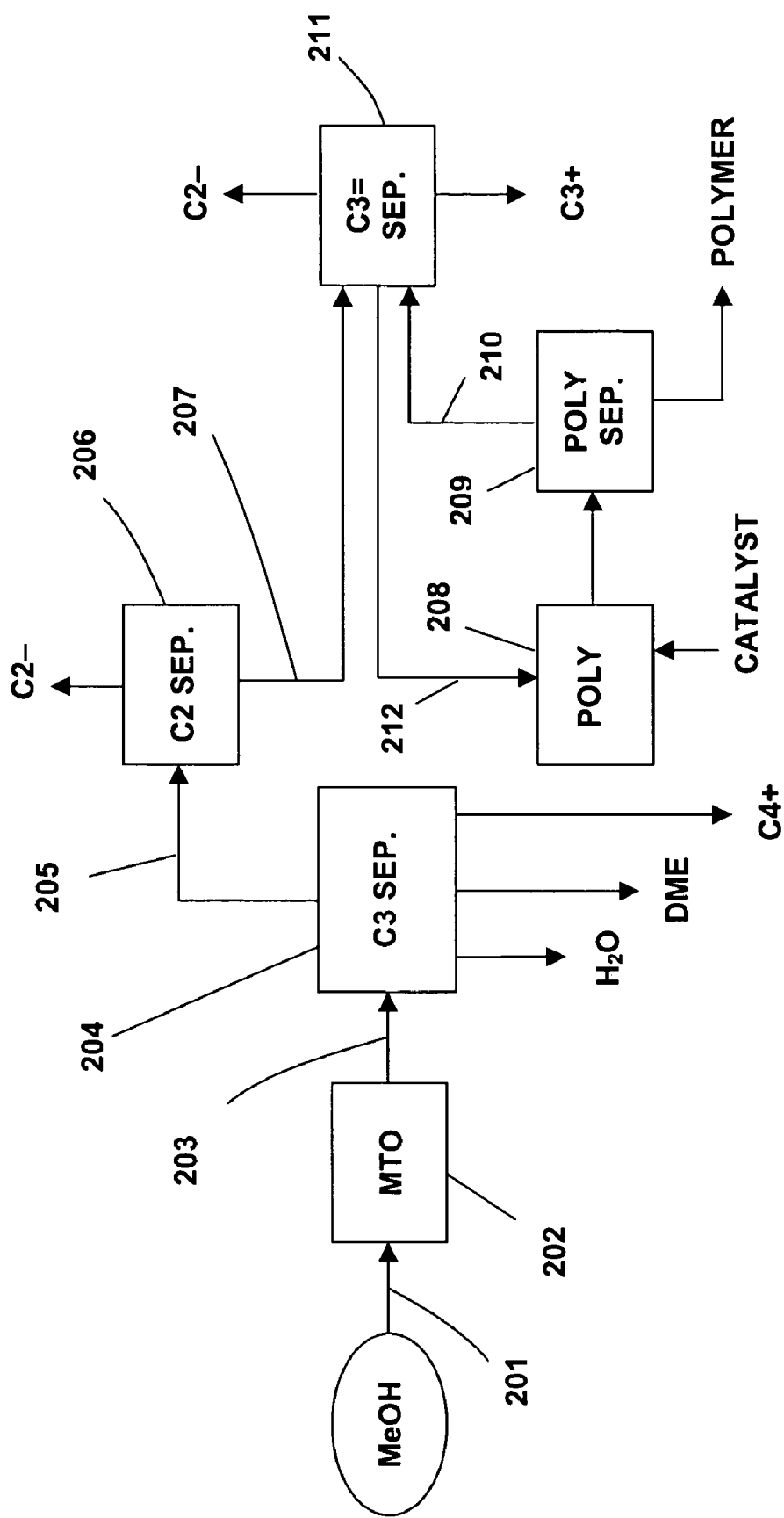
FIG. 2 is a flow diagram showing the separation of an intermediate grade propylene stream and using the intermediate grade propylene stream as a feedstream to a polypropylene reaction system, in which the intermediate grade olefin stream comprises propylene separated from an olefin stream as well as unreacted propylene recovered from polypropylene product.

Another embodiment of the invention is shown in FIG. 2. According to this embodiment, methanol is sent through a line 201 to a methanol to olefins reaction unit 202. Olefin product leaves the reaction unit 202 by way of a line 203, and is sent to a C3 separation system 204. In the C3 separation system 204, which includes at least one distillation column, a propylene-containing stream that includes propane and lighter boiling point hydrocarbons is separated and removed through a line 205 as an overhead distillation stream, while heavier boiling point components such as water ($H_2O$), dimethyl ether (DME), and C4 and heavier boiling point hydrocarbons (C4+) are removed as bottom distillation streams.

The propylene-containing stream flowing through the line 205 is sent to a C2 separation system 206, which includes at least one distillation column. Intermediate grade propylene is separated in the C2 separation system 206 as a bottoms distillation stream, with ethane and lighter boiling point compounds (C2-) being removed as an overhead distillation stream.

The intermediate grade propylene steam is flowed through a line 207 and sent to a propylene (C3=) separation system (i.e., propane purge tower) 211. The propylene separation system 211 is a part of the overall polymerization manufacturing process and is also used to recover unreacted propylene from the polypropylene reaction process. This embodiment is particularly beneficial in that the intermediate grade propylene and propylene recovered as a recycle stream from the polymerization reaction process can be mixed together in a common separation system and the resulting propylene mixture is sent as feed to the reactor without any significant dilution of propylene. Thus, a preferred intermediate grade propylene stream, which includes recovered propylene recycle, is sent to a polypropylene reaction process 208, with a polypropylene forming catalyst also being added. The polypropylene product of the reaction process is sent to a polypropylene separation system 209 where polypropylene polymer is separated from contaminants.

Polypropylene contaminants, which include unreacted propylene and propane, are separated in the separation system 209 and sent through a line 210 to the propylene separation system 111. Ethane and lighter boiling point compounds (C2-), as well as propane and heavier boiling point compounds (C3+), are separated from the unreacted propylene as well as from the propylene stream entering the separation system 211 through line 207 so that the preferred intermediate grade propylene stream is sent through the line 212 to the polypropylene reaction process 208. Thus, the intermediate grade propylene stream that is sent to the reaction system contains at least a portion of the propylene separated from the olefin stream flowing through the line 203 and the removed portion of unreacted propylene recovered from the polymer separation system 209 and sent to the propylene separation system 211 through the line 210.

Having now fully described this invention, it will be appreciated by those skilled in the art that the invention can be performed within a wide range of parameters, without departing from the spirit and scope of the invention.

We claim:

1. A process for making polypropylene, comprising the steps of:
    a) separating a propylene stream and a dimethyl ether stream from an olefin stream, with the propylene stream being separated as an overhead distillation stream and the dimethyl ether stream being separated as a bottoms distillation stream;
    b) recovering an intermediate grade propylene stream from the overhead stream, wherein the intermediate grade propylene stream contains less than 99.5 wt % and at least 95 wt % propylene;
    c) contacting the intermediate grade propylene stream with polypropylene forming catalyst to form polypropylene and unreacted by-product;
    d) recovering propylene from the unreacted by-product to form a recycle stream; and e) contacting the recycle stream with the polypropylene forming catalyst to form additional polypropylene product.

2. The process of claim 1, wherein the intermediate grade propylene stream contains less than 99 wt % propylene, based on total weight of the stream.

3. The process of claim 2, wherein the intermediate grade propylene stream contains less than 98 wt % propylene, based on total weight of the stream.

4. The process of claim 3, wherein the intermediate grade propylene stream contains less than 97 wt % propylene, based on total weight of the stream.

5. The process of claim 1, wherein the polypropylene forming catalyst is a Ziegler Natta or metallocene catalyst.

6. A process for making polypropylene product, comprising the steps of:
   a) contacting an oxygenate stream with an olefin forming catalyst to form on olefin stream, wherein the olefin stream comprises propylene, propane and dimethyl ether;
   b) separating the propylene, propane and dimethyl ether from the olefin stream to obtain an intermediate grade propylene stream, wherein the intermediate grade propylene stream contains less than 99.5 wt % and at least 95 wt % propylene;
   c) contacting the intermediate grade propylene stream with a polypropylene forming catalyst to form a polypropylene product.

7. The process of claim 6, wherein propylene is separated from the polypropylene product to form a recycle stream.

8. The process of claim 7, wherein the recycle stream is contacted with the polypropylene forming catalyst.

9. The process of claim 6, wherein the intermediate grade propylene stream contains less than 99 wt % propylene, based on total weight of the stream.

10. The process of claim 9, wherein the intermediate grade propylene stream contains less than 98 wt % propylene, based on total weight of the stream.

11. The process of claim 10, wherein the intermediate grade propylene stream contains less than 97 wt % propylene, based on total weight of the stream.

12. The process of claim 6, wherein the polypropylene forming catalyst is a Ziegler Natta or metallocene catalyst.

13. A process for making polypropylene product, comprising the steps of:
   a) contacting an oxygenate stream with an olefin forming catalyst to form an olefin stream;
   b) separating a propylene stream from the olefin stream;
   c) sending the propylene stream to a propylene separation system;
   d) recovering an intermediate grade propylene stream from the propylene separation system, wherein the intermediate grade propylene stream contains less than 99.5 wt % and at least 95 wt % propylene;
   e) contacting the intermediate grade propylene stream with a polypropylene forming catalyst to form a polypropylene product and unreacted propylene; and
   f) removing at least a portion of the unreacted propylene in the propylene separation system, wherein the intermediate grade propylene stream further comprises the removed portion of unreacted propylene.

14. The process of claim 13, wherein the propylene separation system includes a distillation column.

15. The process of claim 13, wherein the intermediate grade propylene stream contains less than 99 wt % propylene, based on total weight of the stream.

16. The process of claim 15, wherein the intermediate grade propylene steam contains less than 98 wt % propylene, based on total weight of the stream.

17. The process of claim 16, wherein the intermediate grade propylene stream contains less than 97 wt % propylene, based on total weight of the stream.

18. The process of claim 13, wherein the polypropylene forming catalyst is a Ziegler Natta or metallocene catalyst.

19. The process of claim 1, 6, or 13, wherein the composition of the intermediate stream is based on the composition of the stream supplied to contact the polypropylene catalyst without dilution from other sources.

* * * * *